W. A. GEIGER.
FRICTION GEAR.
APPLICATION FILED DEC. 6, 1916.
1,235,461. Patented July 31, 1917.
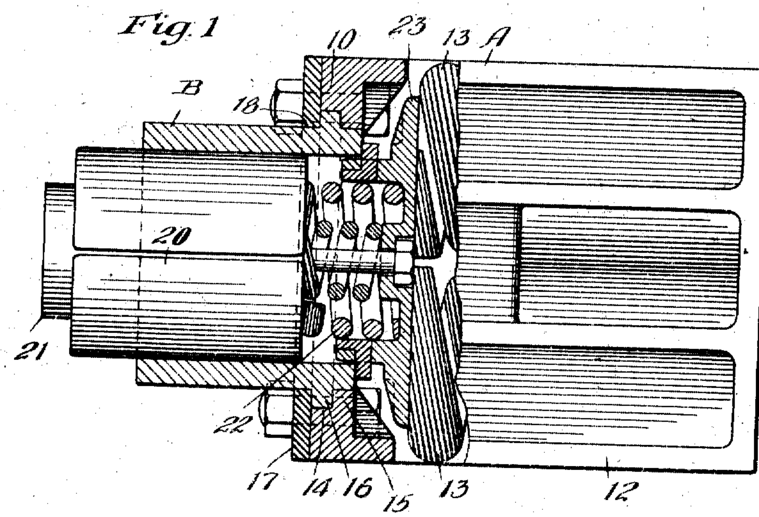
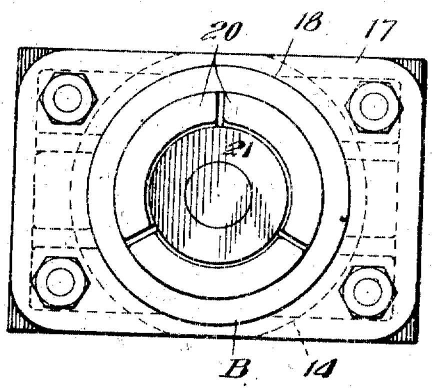
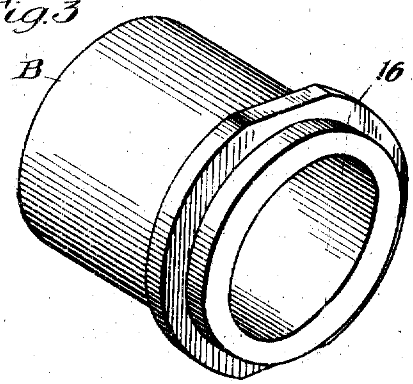
WITNESS
Calvin B. Patch.
INVENTOR.
William A. Geiger
BY George J. Haight
His ATTORNEY

UNITED STATES PATENT OFFICE.

WILLIAM A. GEIGER, OF CHICAGO, ILLINOIS, ASSIGNOR TO WILLIAM H. MINER, OF CHAZY, NEW YORK.

FRICTION-GEAR.

1,235,461. Specification of Letters Patent. Patented July 31, 1917.

Application filed December 6, 1916. Serial No. 135,323.

*To all whom it may concern:*

Be it known that I, WILLIAM A. GEIGER, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

The object of the invention is to provide a combined friction shell and spring casing for friction gears wherein the friction shell is made separate from the spring casing and the parts are detachably secured together.

In the drawing forming a part of this specification, Figure 1 is a part longitudinal section, part side elevation of a friction gear of a well known type, illustrating my improvements in connection therewith. Fig. 2 is an end elevation of the structure illustrated in Fig. 1. And Fig. 3 is a perspective view of the friction cylinder proper, detached.

In said drawing, A designates a spring casing and B a friction cylinder detachably secured thereto. The spring casing is of substantially rectangular form and has a front wall 10, rear wall 11, upper and lower walls 12—12 and open at its sides to permit the insertion of the springs 13. The front wall 10 is provided with an annular recess 14, thus forming a corresponding annular shoulder 15 to receive the inner end of the friction cylinder B. The latter, as shown, is of substantially uniform thickness throughout its length and near its inner end is provided with an annular collar 16 adapted to fit said annular recess 14, the arrangement thus described providing shouldered engagement between the members A and B. The outer surface of the collar 16 is designed to come flush with the outer surface of the end wall 10 of the casing A and in order to hold the parts securely together, a substantially rectangular plate 17 is provided which is centrally recessed as indicated at 18 to snugly fit over the friction cylinder. The plate 17 is slipped over the cylinder B into engagement with the collar 16, as clearly appears from Fig. 1, and is secured to the spring casing A by a plurality of bolts or other suitable fastening devices that extend through said plate and the end wall of the casing. Coöperable with the friction shell B are friction shoes 20, and wedge 21 assembled in a well known manner, there being a preliminary spring 22 between said shoes and the main spring follower 23.

With the arrangement thus provided, it is apparent that the cylinder B is not weakened and may be readily manufactured since the metal of the cylinder proper is of substantially the same thickness throughout its entire length, thus minimizing casting and annealing strains. By providing the shouldered engagement between the shell and casing, the pressure from the cylinder during actuation of the gear is transmitted to the casing over a relatively large area. By removing the plate 17, it is apparent that the friction cylinder can be renewed or replaced with a minimum amount of labor and at small expense, thus prolonging the life of the gear by renewing those portions which are most affected by wear.

I claim:

1. In a friction gear, the combination with a spring casing, of a separate friction shell, said casing and shell having shouldered engagement with each other, and means for securing said casing and shell together including, a series of fastening devices passing through portions of the casing and clear of the shell.

2. In a friction gear, the combination with a spring casing, of a separate friction shell, said casing and shell having shouldered engagement with each other, and means for securing said casing and shell together including, a plate overlapping portions of said shell and casing and fastening devices extending through said plate and casing.

3. As an article of manufacture, a combined friction shell and spring casing for draft gears, said shell and casing comprising, a cylinder friction shell proper having an annular collar near one end thereof and a rectangular spring casing having an annular recess in the front wall thereof to accommodate said collar and thereby provide shouldered engagement between the parts, a centrally recessed plate fitting over said cylinder and engaging the outer face of said collar, and a plurality of fastening devices extending through said plate and the adjacent portions of said spring casing for holding the parts in assembled position.

In witness that I claim the foregoing I have hereunto subscribed my name this 4th day of December 1916.

WILLIAM A. GEIGER.